(12) United States Patent
Miyoshi et al.

(10) Patent No.: US 8,249,181 B2
(45) Date of Patent: *Aug. 21, 2012

(54) MULTI-CARRIER TRANSMISSION DEVICE AND MULTI-CARRIER TRANSMISSION METHOD

(75) Inventors: Kenichi Miyoshi, Kanagawa (JP); Akihiko Nishio, Kanagawa (JP)

(73) Assignee: Panasonic Corporation, Osaka (JP)

( * ) Notice: Subject to any disclaimer, the term of this patent is extended or adjusted under 35 U.S.C. 154(b) by 23 days.

This patent is subject to a terminal disclaimer.

(21) Appl. No.: 12/831,926

(22) Filed: Jul. 7, 2010

(65) Prior Publication Data

US 2010/0272212 A1 Oct. 28, 2010

Related U.S. Application Data (63) Continuation of application No. 11/631,503, filed on Jan. 4, 2007, now Pat. No. 7,778,369.

(30) Foreign Application Priority Data

Jul. 6, 2004 (JP) ................................. 2004-199380

(51) Int. Cl.
*H04L 27/28* (2006.01)
(52) U.S. Cl. ........................................................ 375/260
(58) Field of Classification Search .................. 375/260, 375/295, 261, 296, 297; 370/342, 335; 455/103, 455/115, 116
See application file for complete search history.

(56) References Cited

U.S. PATENT DOCUMENTS 5,883,888 A * 3/1999 St-Pierre ....................... 370/331
6,275,522 B1 8/2001 Johnson 2001/0004389 A1 6/2001 Kimura
2003/0016123 A1 1/2003 Tager
2004/0009783 A1 1/2004 Miyoshi
2005/0043048 A1 * 2/2005 Dolan et al. ................... 455/509
2007/0081498 A1 4/2007 Niwano

FOREIGN PATENT DOCUMENTS

| JP | 11-317723 | 11/1999 |
|---|---|---|
| JP | 2000-358008 | 12/2000 |
| JP | 2001-320306 | 11/2001 |
| JP | 2003-032218 | 1/2003 |

OTHER PUBLICATIONS

PCT International Search Report dated Aug. 23, 2005.
N. Maeda, et al.; Kudari Link Broadband Channel ni Okeru OFCDM to OFDM no Tokusei Hikaku, Shingaku Giho, Aug. 23, 2002, vol. 102, No. 282, pp. 95-100.

* cited by examiner

*Primary Examiner* — Khai Tran
(74) *Attorney, Agent, or Firm* — Dickinson Wright PLLC (57) ABSTRACT

There is provided a multi-carrier transmission device capable of improving a packet error ratio in a system where transmission data is repeatedly multi-carrier-transmitted. In this device, the transmission data is subjected to error correction encoding in an error correction encoding unit (102), modulation in a modulation unit (104), and repetition in a repetition unit (106). A signal after the repetition (repetition bit) is two-dimensionally mapped in the frequency domain and the time domain according to a predetermined pattern in a mapping unit (108). The repetition bit transmission power is controlled so that the total value of the transmission power of repetition bit constituting one bit is identical to all the bits and the repetition bit of preferable reception quality has a large transmission power while the repetition bit of bad reception quality has a small transmission power.

6 Claims, 9 Drawing Sheets

MULTI-CARRIER TRANSMISSION DEVICE AND MULTI-CARRIER TRANSMISSION METHOD

This is a continuation application of application Ser. No. 11/631,503 filed Jan. 4, 2007, which is a national stage of PCT/JP2005/009472 filed May 24, 2005, which is based on Japanese Application No. 2004-199380 filed Jul. 6, 2004, the entire contents of each which are incorporated by reference herein.

TECHNICAL FIELD

The present invention relates to a multicarrier transmitting apparatus and multicarrier transmitting method.

BACKGROUND ART

When high-speed transmission is carried out in mobile communications, the effect of delayed waves due to multipath propagation cannot be ignored, and transmission characteristics degrade due to frequency selective fading. Therefore, multicarrier methods such as OFDM (Orthogonal Frequency Division Multiplexing) are now attracting attention as one kind of technology for combating frequency selective fading. A multi carrier method is a technology that achieves high-speed transmission by transmitting data using a plurality of carriers (subcarriers) whose transmission speed is suppressed to a level at which frequency selective fading does not occur. With the OFDM modulation method, in particular, the sub-carriers on which data is placed are mutually orthogonal, making this the multicarrier modulation method offering the highest spectral efficiency. Moreover, the OFDM modulation method can be implemented with a comparatively simple hardware configuration. For these reasons, OFDM is an object of particular attention, and various related studies are being undertaken.

As one example of such studies, a technology has been developed whereby duplication (so-called "repetition") of transmit data is performed, and transmission is performed by OFDM (Non-patent Document 1).

A technology has also been developed whereby, in a multicarrier method, maximal-ratio combining type transmission power control is performed according to overall subcarrier quality information—that is, the lower the channel quality level of a subcarrier, the lower its transmission power is made, and the higher the channel quality level of a subcarrier, the higher its transmission power is made (Patent Document 1, Patent Document 2).

Hereinafter, for convenience, transmission by means of an OFDM method (or multicarrier method) will be referred to as "OFDM (or multicarrier) transmission," and transmission in which maximal-ratio combining type transmission power control is performed will be referred to as "maximal-ratio combining transmission."

Non-patent Document 1: Maeda, Atarashi, Kishiyama, Sawahashi, "Performance Comparisons between OFCDM and OFDM in a Forward Link Broadband Channel", Technical report of IEICE, RCS2002-162, August 2002

Patent Document 1: Japanese Patent Application Laid-Open No. 2000-358008

Patent Document 2: Japanese Patent Application Laid-Open No. HEI 11-317723

DISCLOSURE OF INVENTION

Problems to be Solved by the Invention

However, if the above two technologies are simply combined—that is, if a technology whereby maximal-ratio combining transmission is performed for all subcarriers is applied to a system in which OFDM transmission is performed using transmit data repetition—there is a risk of the power of a particular bit being too low and unable to be received correctly, resulting in the occurrence of a packet error.

If, for example, transmission power is controlled low in all subcarriers to which a signal in which repetition of a particular bit is performed is assigned, that bit cannot be demodulated on the receiving side. As a result, the packet containing that bit is regarded as an error packet, and the packet error rate deteriorates. An actual example will be described later herein using a drawing.

It is an object of the present invention to provide a multicarrier transmitting apparatus and multicarrier transmitting method that enable the packet error rate to be improved in a system in which multicarrier transmission is performed using transmit data repetition.

Means for Solving the Problems

A multicarrier transmitting apparatus of the present invention employs a configuration that includes: a duplication section that performs duplication (repetition) of transmit data; a mapping section that maps a post-duplication signal in the frequency domain and the time domain; a transmission power control section that performs transmission power control of a post-mapping signal; and a transmitting section that transmits a transmission-power-controlled signal using a multicarrier method; wherein the transmission power control section performs maximal-ratio combining type transmission power control within each bit or each symbol for the post-mapping signal while keeping the transmission power assigned to each bit or each symbol constant.

Advantageous Effect of the Invention

The present invention enables the packet error rate to be improved in a system in which multicarrier transmission is performed using transmit data repetition.

BEST MODE FOR CARRYING OUT THE INVENTION

An embodiment of the present invention will now be described in detail with reference to the accompanying drawings.

Figure 3:
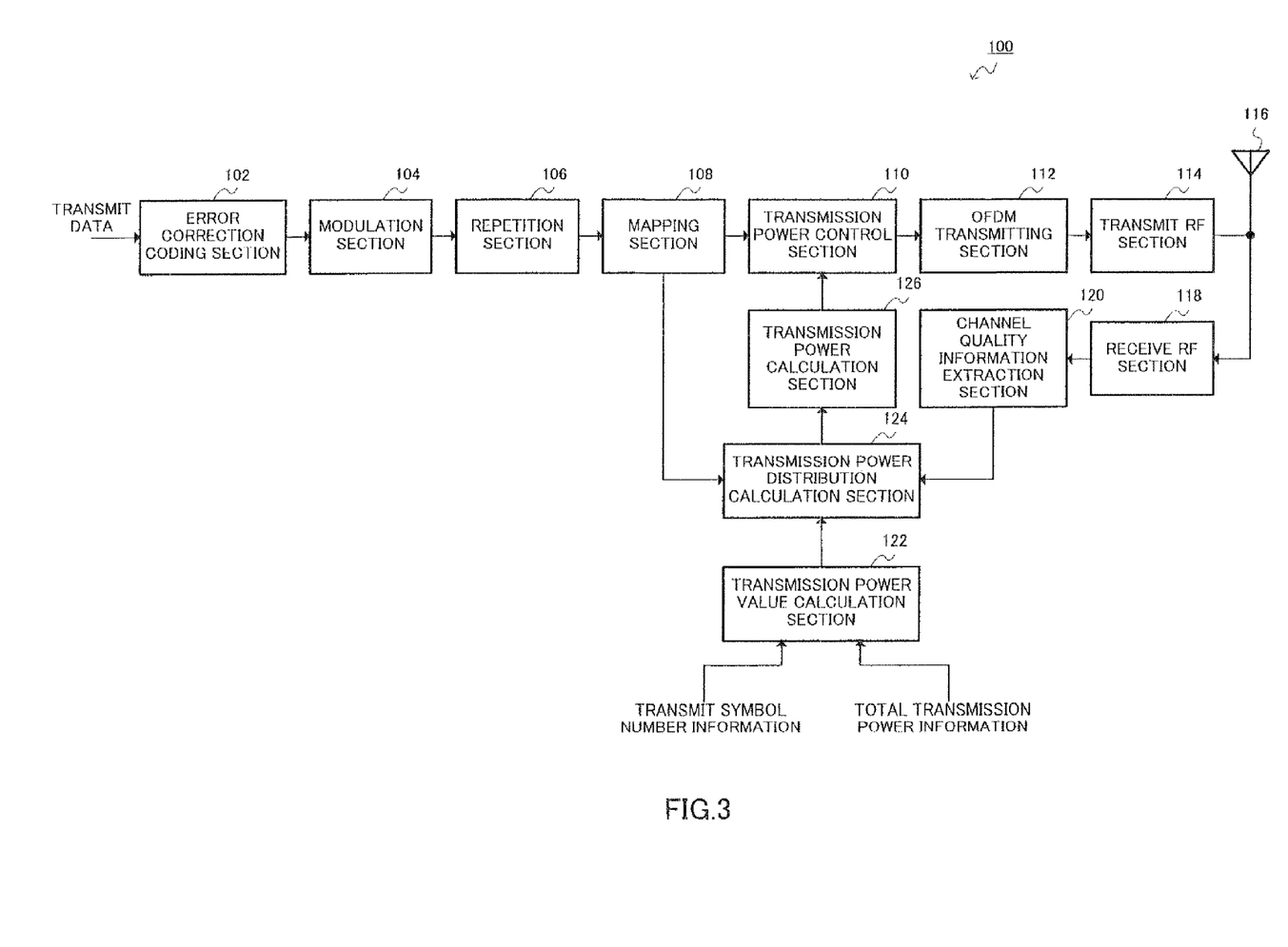
FIG. 3 is a block diagram showing the configuration of a multicarrier transmitting apparatus according to one embodiment of the present invention.

FIG. 3 is a block diagram showing the configuration of a multicarrier transmitting apparatus according to one embodiment of the present invention.

Multicarrier transmitting apparatus (hereinafter referred to simply as "transmitter") 100 shown in FIG. 3 is a system that performs OFDM transmission using repetition of transmit data (hereinafter referred to as "repetition OFDM"), and has an error correction coding section 102, a modulation section 104, a repetition section 106, a mapping section 108, a transmission power control section 110, an OFDM transmitting section 112, a transmit RF (Radio Frequency) section 114, a dual-function transmitting/receiving antenna 116, a receive RF section 118, a channel quality information extraction section 120, a transmission power value calculation section 122, a transmission power distribution calculation section 124, and a transmission power calculation section 126. Transmitter 100 is installed, for example, in a base station apparatus in a multicarrier (in this embodiment, OFDM) mobile communication system.

Error correction coding section 102 performs error correction coding at a predetermined coding rate, such as R=½, for example, on transmit data output from a baseband section or the like (not shown), and outputs transmit data after error correction coding to modulation section 104.

Modulation section 104 generates a transmit symbol by modulating transmit data output from error correction coding section 102 using a predetermined modulation method. The generated symbol is output to repetition section 106.

Repetition section 106 duplicates a transmit symbol output from modulation section 104 until a predetermined number of duplicates are reached, and outputs the duplicated transmit symbols to mapping section 108. A signal output from repetition section 106—that is, a post-repetition signal—will hereinafter be referred to as a "repetition bit."

Mapping section 108 maps repetition bits output from repetition section 106 in accordance with a predetermined mapping method. For example, repetition bits are mapped 2-dimensionally in the frequency domain and time domain based on a predetermined pattern. At this time, repetition bits are mapped while being interleaved in the frequency domain and/or time domain. Post-mapping transmit data (repetition bits) are output to transmission power control section 110. Mapping section 108 outputs mapping processing results to transmission power distribution calculation section 124. An actual example of a mapping method will be described later herein.

Transmission power control section 110 controls repetition bit transmission power in accordance with calculation results of transmission power calculation section 126. Transmission power control will be described in detail later herein.

OFDM transmitting section 112 generates an OFDM signal that has undergone repetition processing by performing OFDM transmission processing on a transmission-power-controlled signal. Specifically, for example, a transmission-power-controlled signal undergoes Inverse Fast Fourier Transform (IFFT) processing, then the IFFT-processed parallel signal undergoes parallel/serial conversion to a serial signal, and a Guard Interval (GI) is inserted in the obtained serial signal (OFDM signal). After GI insertion, the OFDM signal is output to transmit RF section 114.

Transmit RF section 114 has a digital/analog converter, low-noise amplifier, bandpass filter, and so forth, and executes predetermined radio processing such as up-conversion on the OFDM signal output from OFDM transmitting section 112. After radio processing, the OFDM signal is transmitted as a radio signal from antenna 116.

A radio signal transmitted from antenna 116 is received by a communication terminal apparatus such as a mobile station apparatus in a mobile communication system. The communication terminal apparatus measures the reception quality of a signal transmitted from transmitter 100 on a subcarrier-by-subcarrier basis, and transmits the reception quality of each subcarrier to transmitter 100 as channel quality information. At this time, channel quality information is transmitted contained in a signal transmitted from the communication terminal apparatus to transmitter 100, for example.

Receive RF section 118 has an analog/digital converter, low-noise amplifier, bandpass filter, and so forth, and executes predetermined radio processing such as down-conversion on a signal received by antenna 116. An output signal (baseband signal) from receive RF section 118 is output to channel quality information extraction section 120.

Channel quality information extraction section 120 extracts channel quality information (per-subcarrier reception quality) from the receive RF section 118 output signal (baseband signal). The extracted channel quality information is output to transmission power distribution calculation section 124.

Transmission power value calculation section 122 calculates a per-symbol transmission power value. Specifically, for example, transmission power value calculation section 122 receives information on the number of transmit symbols and information on total transmission power from an upper layer in which radio resource allocation is performed, and uses these two items of information (transmit symbol number information and total transmission power information) to calculate a per-symbol transmission power value (transmission power value per symbol=total transmission power±number of transmit symbols). The calculated per-symbol transmission power value is output to transmission power distribution calculation section 124.

Transmission power distribution calculation section 124 calculates the transmission power distribution within one symbol using the mapping processing results output from mapping section 108, channel quality information (per-subcarrier reception quality) output from channel quality information extraction section 120, and the per-symbol transmission power value output from transmission power value calculation section 122. Specifically, for example, transmission power distribution calculation section 124 checks the reception quality of each repetition bit based on the reception quality of each subcarrier reported from the receiving side (communication terminal apparatus), and calculates transmission power distribution within one symbol so that the total value of transmission power of repetition bits composing one bit is the same for all bits, and so that transmission power is greater for a repetition bit with good reception quality and smaller for a repetition bit with poor reception quality. The calculated transmission power distribution within one symbol is output to transmission power calculation section 126.

Transmission power calculation section 126 calculates the transmission power value of each repetition bit in one symbol in accordance with the transmission power distribution within one symbol output from transmission power distribution calculation section 124. The calculation results are output to transmission power control section 110.

Next, the principal operations of transmitter 100 having the above configuration will be described using FIG. 4 through FIG. 10.

Figure 1:
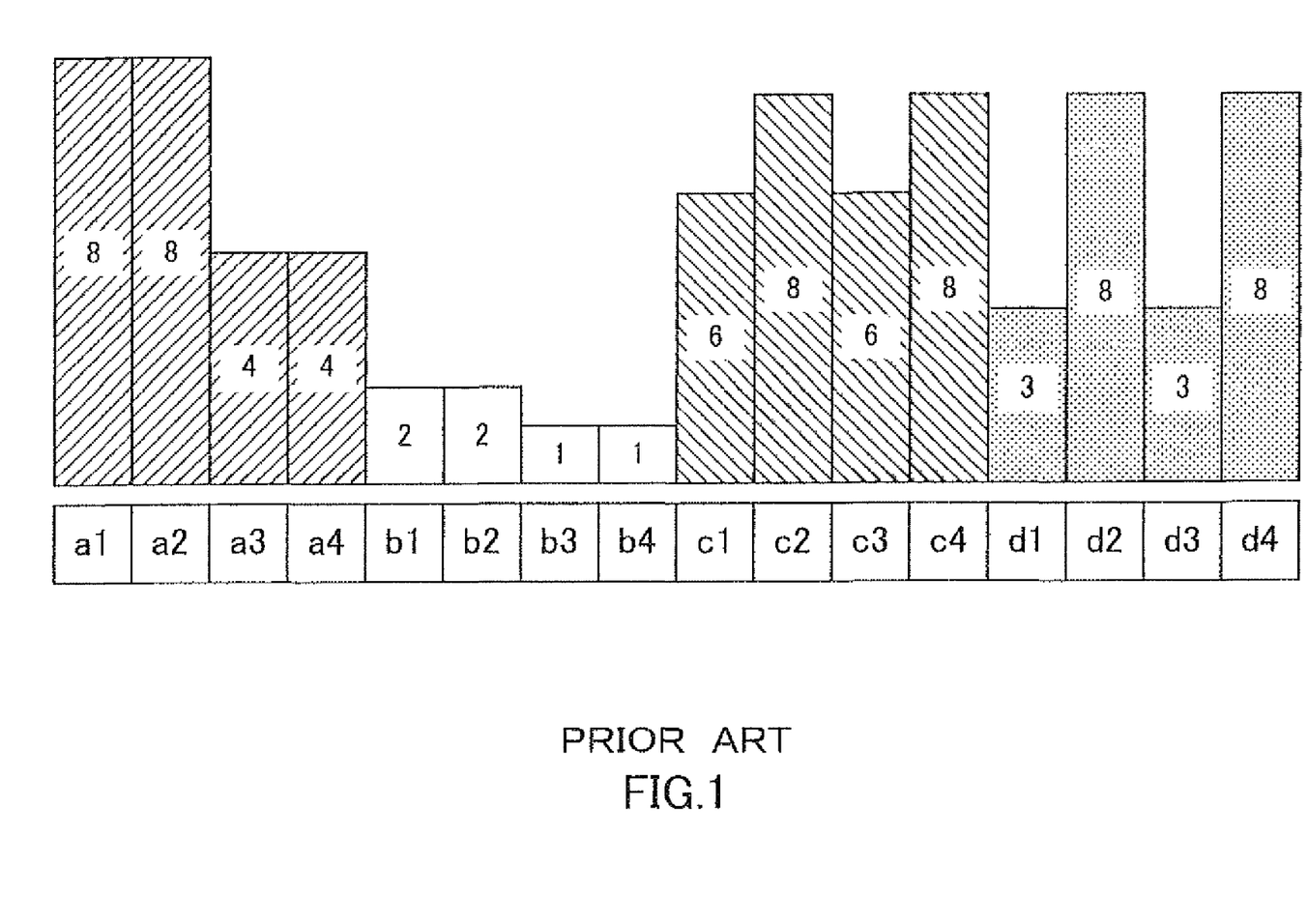
FIG. 1 is a drawing showing repetition hit transmission power when conventional technologies are simply combined.
Figure 2:
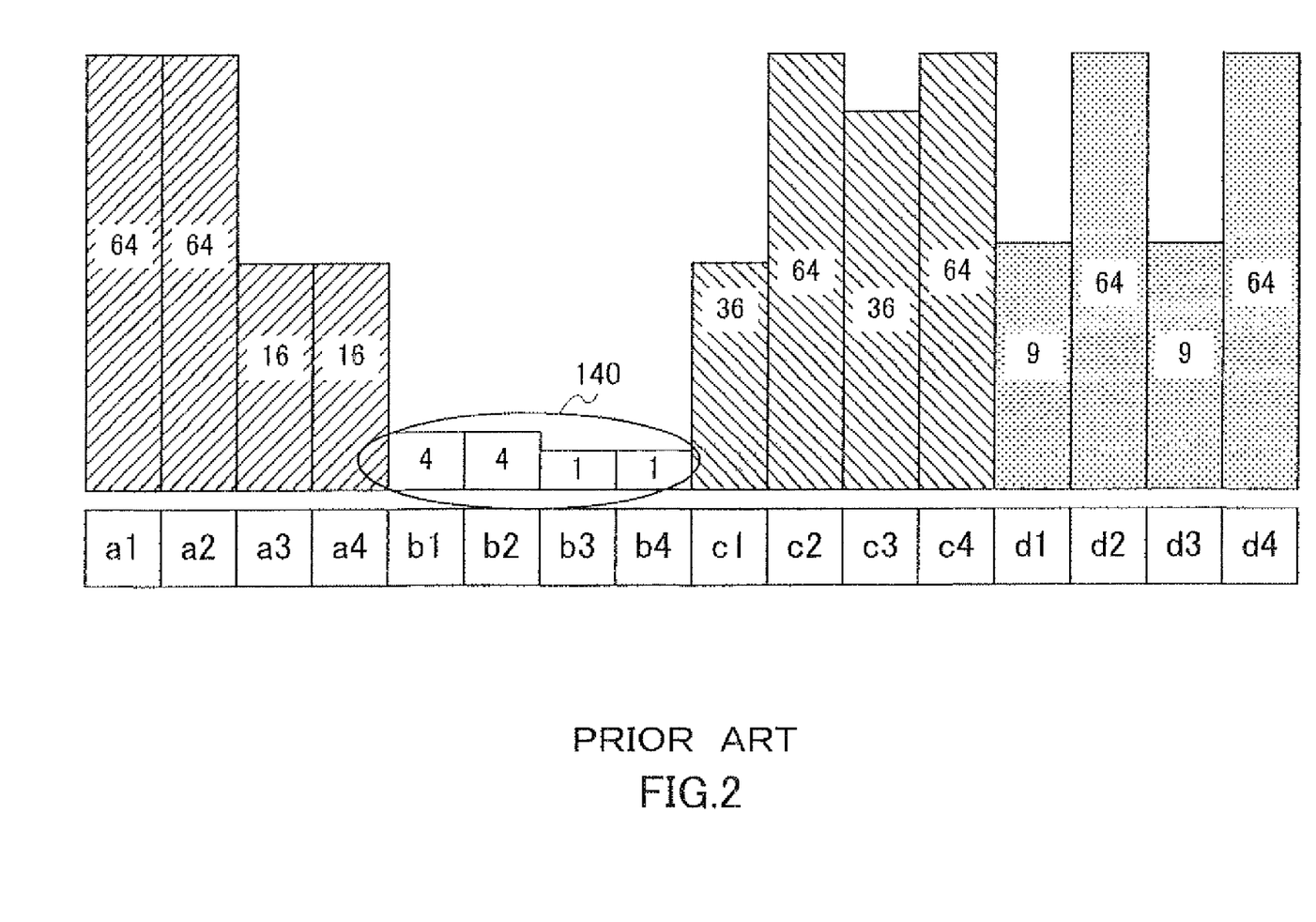
FIG. 2 is a drawing showing repetition bit received power when conventional technologies are simply combined.
Figure 4:
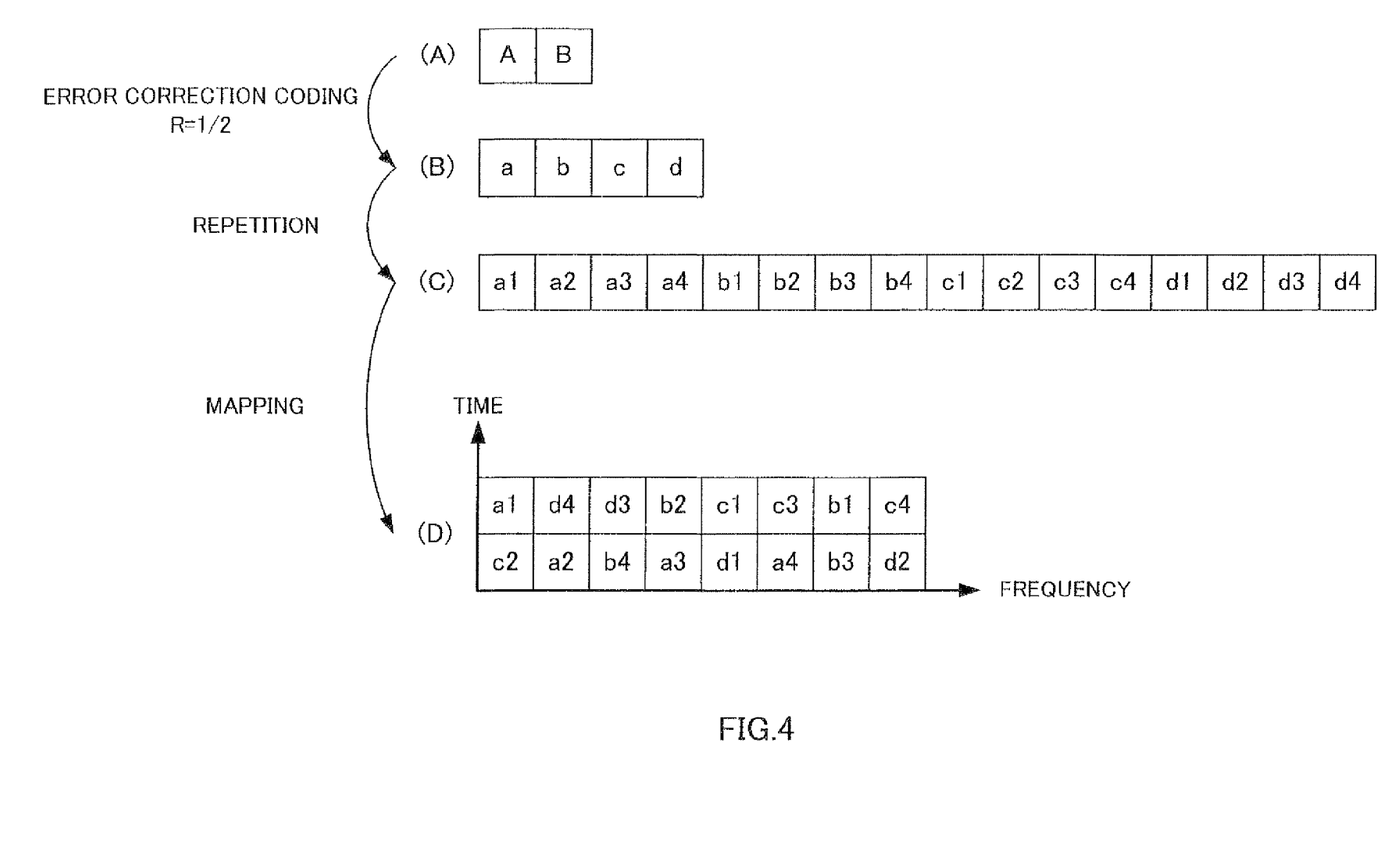
FIG. 4 is a drawing explaining the operation of a multicarrier transmitting apparatus according to this embodiment.
Figure 5:
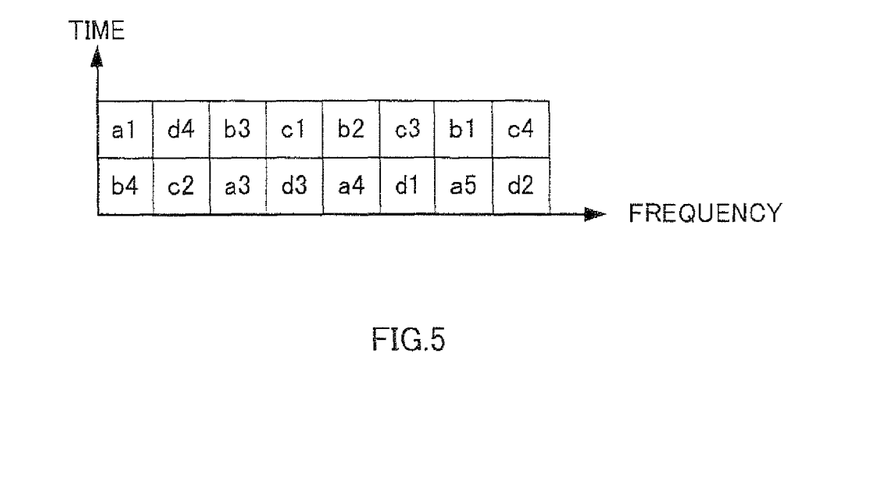
FIG. 5 is a drawing showing another example of a mapping method.
Figure 6:
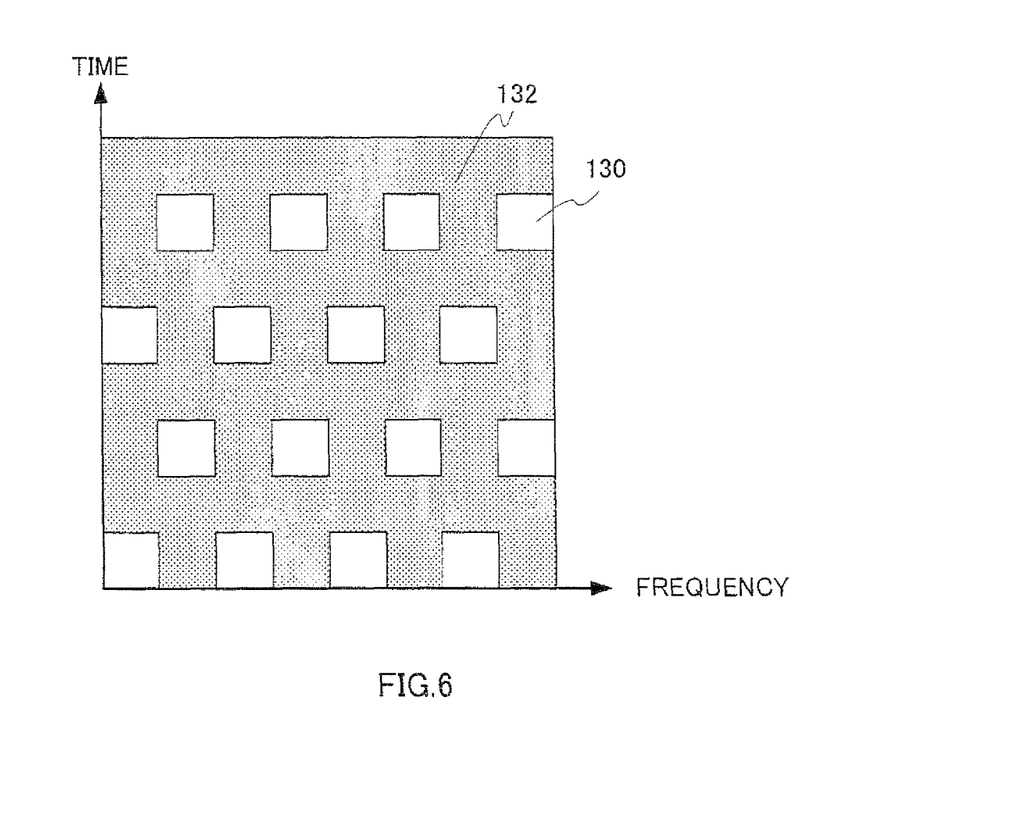
FIG. 6 is a drawing showing yet another example of a mapping method.
Figure 7A:
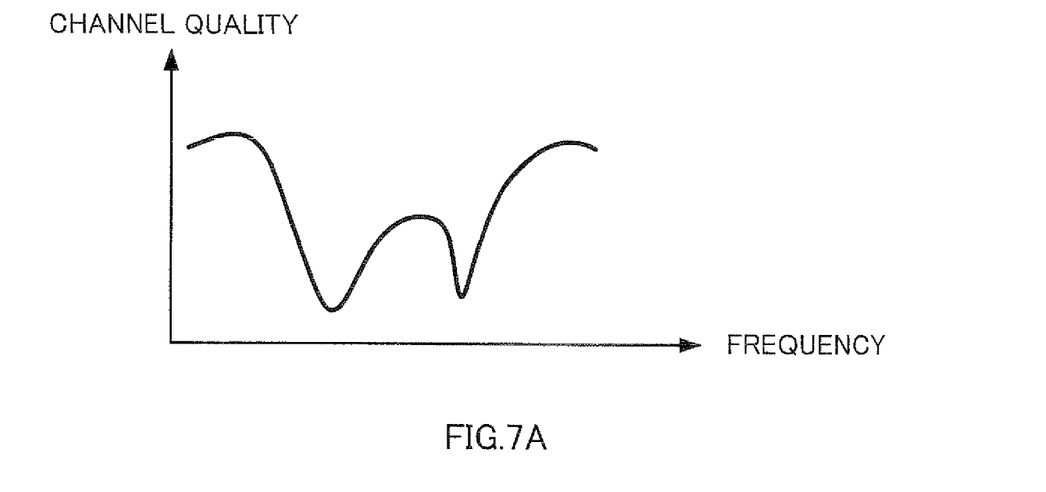
FIG. 7A is a drawing showing the reception quality of each subcarrier at a certain time.
Figure 7B:
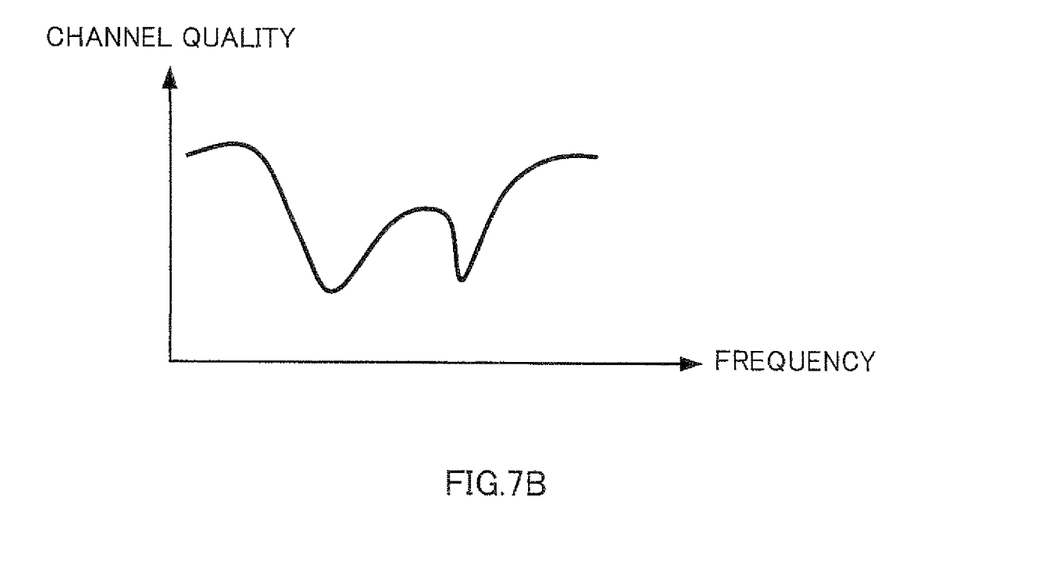
FIG. 7B is a drawing showing the reception quality of each subcarrier at another time.
Figure 8A:
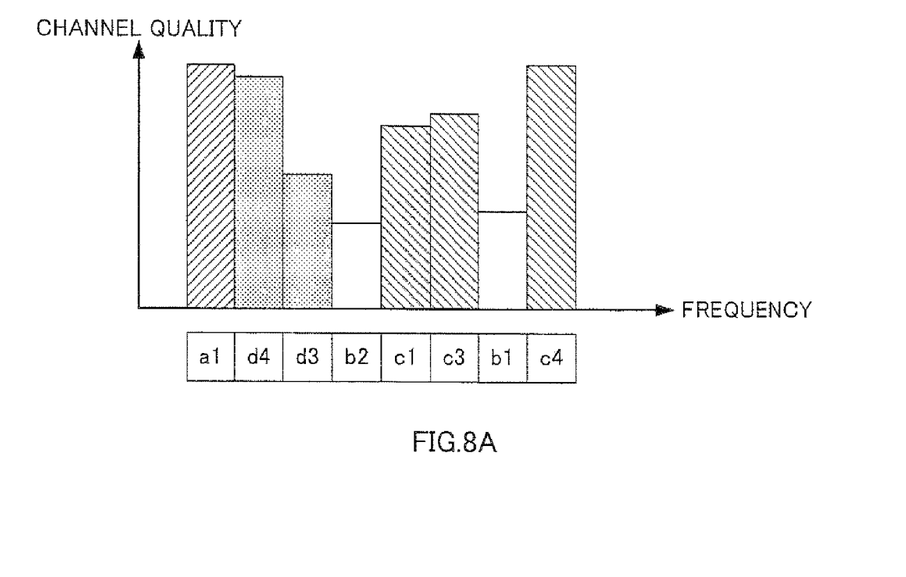
FIG. 8A is a drawing showing the reception quality of each repetition bit at a certain time.
Figure 8B:
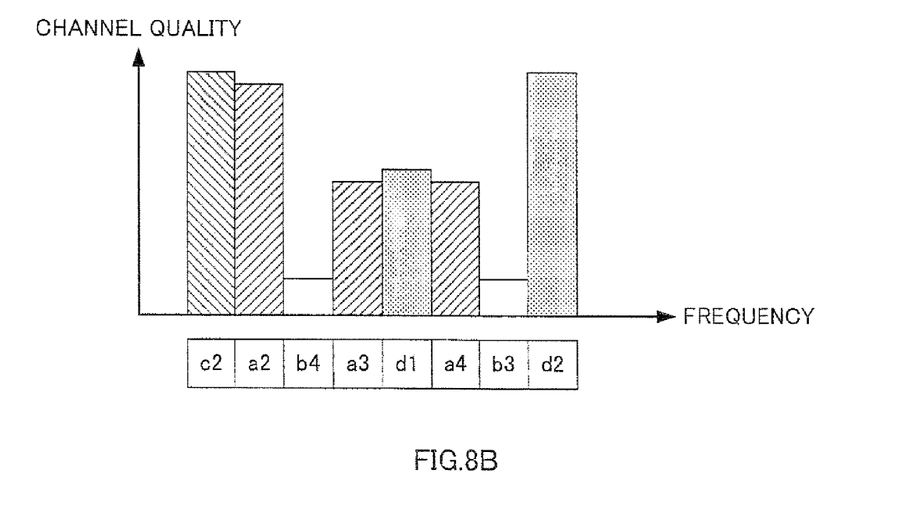
FIG. 8B is a drawing showing the reception quality of each repetition bit at another time.
Figure 9:
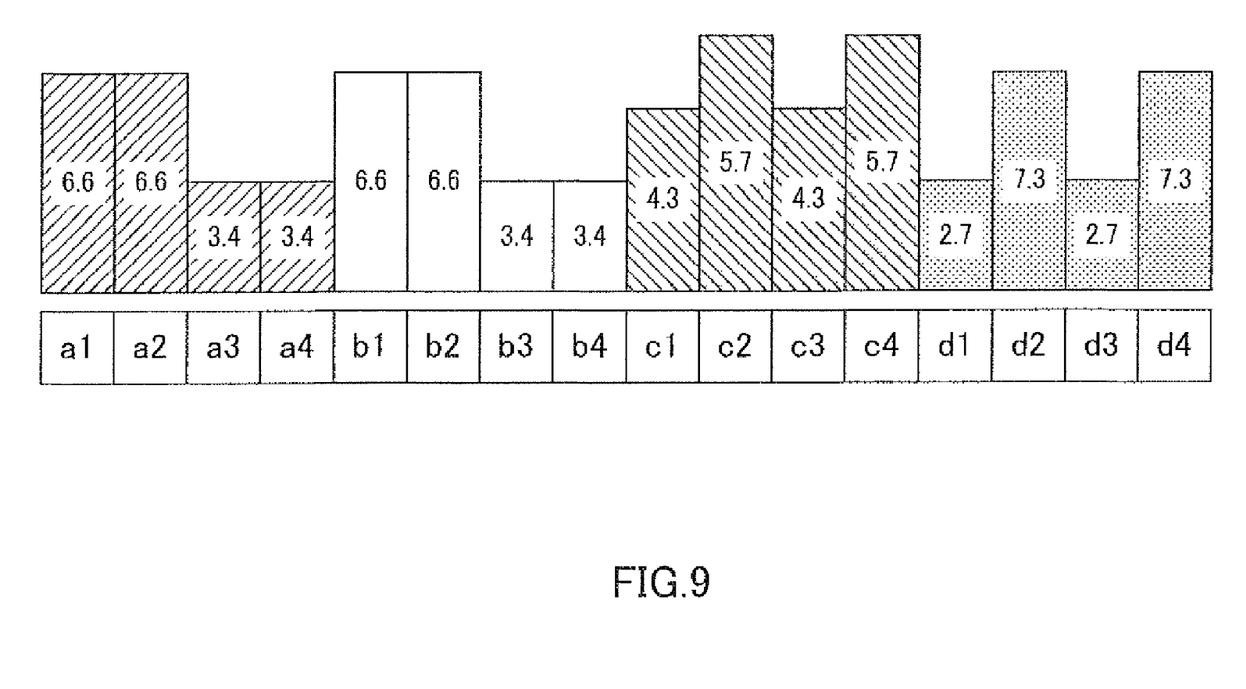
FIG. 9 is a drawing showing the transmission power of repetition bits according to this embodiment.
Figure 10:
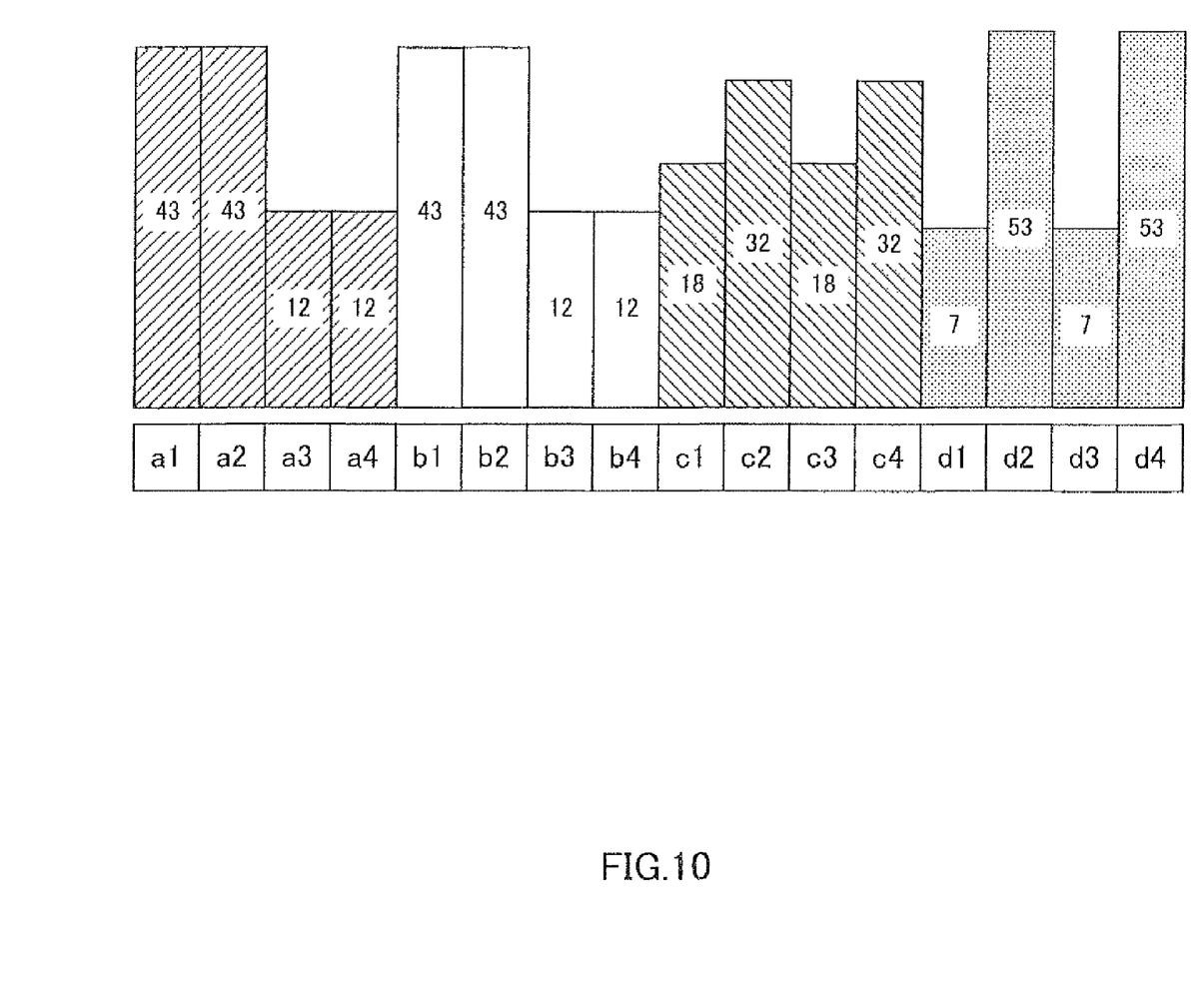
FIG. 10 is a drawing showing the received power of repetition bits according to this embodiment.

FIG. 4(A) shows transmit data before error correction coding, FIG. 4(B) shows transmit data after error correction coding, FIG. 4(C) shows a signal after repetition (repetition bits), and FIG. 4(D) shows the result of repetition bit mapping. FIG. 5 is a drawing showing another example of a mapping method, and FIG. 6 is a drawing showing yet another example of a mapping method. FIG. 7A is a drawing showing the reception quality of each subcarrier at a certain time, and FIG. 7B is a drawing showing the reception quality of each subcarrier at another time. FIG. 8A is a drawing showing the reception quality of each repetition bit at a certain time, and FIG. 8B is a drawing showing the reception quality of each repetition bit at another time. FIG. 9 is a drawing showing the transmission power of repetition bits according to this embodiment, and FIG. 10 is a drawing showing the received power of repetition bits according to this embodiment. FIG. 1 is a drawing for comparison with FIG. 9, showing repetition hit transmission power when conventional technologies are simply combined, and FIG. 2 is a drawing for comparison with FIG. 10, showing repetition bit received power when conventional technologies are simply combined.

Transmitter 100 first performs error correction coding of transmit data using a predetermined coding rate in error correction coding section 102. For example, the transmit data shown in FIG. 4(B) is obtained by performing error correction coding of the transmit data shown in FIG. 4(A) with coding rate $R=\frac{1}{2}$. For the sake of simplicity, FIG. 4(A) shows only 2 bits.

Then, in modulation section 104, a transmit symbol is generated by modulating transmit data output from error correction coding section 102 (see FIG. 4(B)) using a predetermined modulation method. There are no particular restrictions on the modulation method used by modulation section 104, and any modulation method can be used, including BPSK (Binary Phase Shift Keying), QPSK (Quadrature Phase Shift Keying), 16QAM (Quadrature Amplitude Modulation), 64QAM, 256QAM, and so forth.

Repetition section 106 then duplicates the transmit symbol output from modulation section 104 until a predetermined number of duplicates are reached. For example, each bit of the 4-bit signal shown in FIG. 4(B) is duplicated three times, giving the 16-bit signal (repetition bits) shown in FIG. 4(C). Here, a1, a2, a3, and a4 are a and its duplicates, b1, b2, b3, and b4 are b and its duplicates, c1, c2, c3, and c4 are c and its duplicates, and d1, d2, d3, and d4 are d and its duplicates.

Next, mapping section 108 maps the repetition bits output from repetition section 106 (see FIG. 4(C)) in accordance with a predetermined mapping method. For example, repetition bits are mapped 2-dimensionally in the frequency domain and time domain as shown in FIG. 4(D) based on a predetermined pattern. Here, repetition bits are mapped while being interleaved in the frequency domain and time domain.

When the above-described 2-dimensional mapping is performed by mapping section 108, it is desirable for a following mapping method to be used. Firstly, signals that have undergone repetition are not arranged in adjacent positions, as shown in FIG. 5 for example, and secondly, signals 130 that have undergone repetition are arranged so as to be mutually separated when mapped, as shown in FIG. 6, for example, and signals of another channel are transmitted in the part 132 between the separated signals 130.

Through use in combination with repetition OFDM, the mapping method shown in FIG. 5 or FIG. 6 offers improved performance, through attainment of the following effect, compared with use in combination with an OFDM method that includes spreading—that is, a method combining CDMA (Code Division Multiple Access) and OFDM (called both MC (multicarrier)-CDMA and OFDM-CDMA).

With an OFDM method that includes spreading, performance degrades if post-spreading signals (chip data) are arranged in separated positions. The reason for this is as follows. When signals are code-multiplexed in CDMA, if the variance of post-spreading signal received power is large, inter-code interference occurs and reception SIR degrades, leading to a major degradation of reception error rate characteristics. In this regard, when chip data are arranged in separated positions in an OFDM method that includes spreading, the variance of post-spreading signal (chip data) received power becomes large. This is because, when signals are arranged in separated positions, propagation path differences between places at which chip data are arranged are great due to the effects of frequency selective fading, and differences in received power also become great. Therefore, if chip data are arranged in separated positions in an OFDM method that includes spreading, inter-code interference occurs and reception SIR degrades, and reception error rate characteristics deteriorate significantly.

In contrast, the kind of performance degradation described above does not occur with repetition OFDM. The reason for this is as follows. Since signals are not code-multiplexed in repetition OFDM, inter-code interference does not occur even if the variance of post-repetition signal received power is large. Therefore, SIR degradation does not occur and reception error rate characteristics do not deteriorate. On the contrary, with repetition OFDM, performance actually improves as the variance of post-repetition signal received power increases. This is because diversity gain can be obtained on the receiving side by means of maximal-ratio combining in post-repetition signal reception.

Transmission power control section 110 then controls repetition bit transmission power in accordance with the processing results of transmission power value calculation section 122, transmission power distribution calculation section 124, and transmission power calculation section 126. Specifically, transmission power value calculation section 122 first receives information on the number of transmit symbols and information on total transmission power from an upper layer, and uses these two items of information (transmit symbol number information and total transmission power information) to calculate a per-symbol transmission power value (transmission power value per symbol=total transmission power÷number of transmit symbols). Transmission power distribution calculation section 124 then checks the reception quality of each repetition bit (see FIG. 8A and FIG. 8B) based on the result of mapping processing output from mapping section 108 (see FIG. 4(D)) and the reception quality of each subcarrier reported from the receiving side (see FIG. 7A and FIG. 7B), and calculates transmission power distribution within one symbol so that the total value of transmission power of repetition bits composing one bit is the same for all bits, and so that transmission power is greater for a repetition bit with good reception quality and smaller for a repetition bit with poor reception quality (see FIG. 9). Then transmission power calculation section 126 calculates the transmission power value of each repetition bit in one symbol in accordance with that transmission power distribution within one symbol.

For the mapping results shown in FIG. 4(D), for example, if the reception quality of each subcarrier at respective times is assumed to be as shown in FIG. 7A and FIG. 7B, the reception quality of each repetition bit is determined to be as shown in FIG. 8A and FIG. 8B respectively.

At this time, in this embodiment, control is performed so that the total value of transmission power of repetition bits composing a particular bit is the same for all bits. Specifically, control is performed so that a1+a2+a3+a4=b1+b2+b3+b4=c1+c2+c3+c4=d1+d2+d3+d4. That is to say, transmission power is controlled so as to be a fixed value from a bit unit standpoint.

For example, if the number of transmit symbols is 4 and the total transmission power is 80, first, distributing the total transmission power (80) equally among the transmit symbols gives a per-symbol transmission power value of 20. Then the per-symbol transmission power value (20) is further distributed according to the channel quality (reception quality) ratio within each transmit symbol. From FIG. 8A and FIG. 8B, it can be seen that the reception quality ratio of a1, a2, a3, and a4 is 8:8:4:4, the reception quality ratio of b1, b2, b3, and b4 is 2:2:1:1, the reception quality ratio of c1, c2, c3, and c4 is 6:8:6:8, and the reception quality ratio of d1, d2, d3, and d4 is 3:8:3:8. Therefore, distributing the per-symbol transmission power value within each transmit symbol (20) according to the reception quality ratios gives transmission power values, as shown in FIG. 9, of 6.6, 6.6, 3.4, and 3.4 respectively for a1, a2, a3, and a4; 6.6, 6.6, 3.4, and 3.4 respectively for b1, b2, b3, and b4; 4.3, 5.7, 4.3, and 5.7 respectively for c1, c2, c3, and c4; and 2.7, 7.3, 2.7, and 7.3 respectively for d1, d2, d3, and d4. That is to say, in this embodiment, maximal-ratio combining transmission is performed in each bit so that the transmission power assigned to each bit is the same. At this time, the square of transmission power appears in a received signal due to fading, and therefore the received power of each repetition bit is as shown in FIG. 10. That is to say, reception quality is satisfactory for all bits, enabling all bits to be received correctly.

Thus, in this embodiment, since transmission power is controlled so as to be a fixed value from a bit unit standpoint, the transmission power of a specific bit does not fall to an extreme degree. This enables the packet error rate to be improved.

In contrast, when a technology whereby maximal-ratio combining transmission is performed for subcarriers overall is simply applied to a system in which OFDM transmission is performed using transmit data repetition, maximal-ratio combining type transmission power control is performed according to the overall subcarrier reception quality, so that there is a risk that the transmission power of a particular bit will be too low to be received correctly, as described above, and a packet error will occur.

For example, when the reception quality of each repetition bit is as shown in FIG. 8A and FIG. 8B, if the total transmission power (80) equally is distributed according to the channel quality (reception quality) ratios, the transmission power values of a1, a2, a3, a4, b1, b2, b3, b4, c1, c2, c3, c4, d1, d2, d3, and d4 are, respectively, 8, 8, 4, 4, 2, 2, 1, 1, 6, 8, 6, 8, 3, 8, 3, and 8. At this time, the square of transmission power appears in a received signal due to fading, and therefore the received power of each repetition bit is as shown in FIG. 2.

That is to say, as the subcarriers of repetition bits b1 through b4 composing bit "b" have low reception quality (see FIG. 8A and FIG. 8B), they are transmitted at low power (see FIG. 1). Therefore, on the receiving side, the received power of repetition bits b1 through b4 is excessively low (the area indicated by reference code 140 in FIG. 2) and cannot be received correctly, and bit "b" cannot be demodulated correctly. If bit "b" is incorrectly demodulated, the packet containing that bit is processed as an error packet, and thus the entire packet is processed as an erroneous packet and system throughput falls significantly.

Thus, according to this embodiment, maximal-ratio combining type transmission power control is performed within each bit while keeping the transmission power assigned to each bit constant, thereby making it possible to avoid a situation in which subcarriers with low transmission power are concentrated in a specific bit, and enabling the packet error rate to be improved.

In the above embodiment, a case has been described by way of example in which the present invention is configured as hardware, but it is also possible for the present invention to be implemented by software.

The function blocks used in the description of the above embodiment are typically implemented as LSIs, which are integrated circuits. These may be implemented individually as single chips, or a single chip may incorporate some or all of them. Here, the term LSI has been used, but the terms IC, system LSI, super LSI, and ultra LSI may also be used according to differences in the degree of integration.

The method of implementing integrated circuitry is not limited to LSI, and implementation by means of dedicated circuitry or a general-purpose processor may also be used. An FPGA (Field Programmable Gate Array) for which programming is possible after LSI fabrication, or a reconfigurable processor allowing reconfiguration of circuit cell connections and settings within an LSI, may also be used.

In the event of the introduction of an integrated circuit implementation technology whereby LSI is replaced by a different technology as an advance in, or derivation from, semiconductor technology, integration of the function blocks may of course be performed using that technology. The adaptation of biotechnology or the like is also a possibility.

The present application is based on Japanese Patent Application No. 2004-199380 filed on Jul. 6, 2004, entire content of which is expressly incorporated herein by reference.

INDUSTRIAL APPLICABILITY

A multicarrier transmitting apparatus and multicarrier transmitting method of the present invention have an effect of enabling the packet error rate to be improved in a system in which multicarrier transmission is performed using transmit data repetition, and are suitable for use in a base station apparatus or the like in a multicarrier mobile communication system.

The invention claimed is:

1. A multicarrier transmitting apparatus comprising:
a repetition section that duplicates transmit data to generate a duplicated signal;
a mapping section that maps the duplicated signal in accordance with a predetermined mapping method;
a transmission power control section that performs transmission power control of the duplicated and mapped signal to output a transmission-power-controlled signal; and
a transmitting section that transmits the transmission-power-controlled signal using a multicarrier method, wherein
the transmission power control section performs maximal-ratio combining type transmission power control within each bit or each symbol for the duplicated and mapped signal while keeping transmission power assigned to each bit or each symbol constant.

2. The multicarrier transmitting apparatus according to claim 1, further comprising an acquisition section that acquires per-subcarrier channel quality information, wherein the transmission power control section comprises:

a first calculation section that calculates per-bit or per-symbol transmission power based on transmit bit number information and total transmission power information; and a second calculation section that, based on the acquired per-subcarrier channel quality information and the calculated per-bit or per-symbol transmission power, calculates transmission power within each bit or each symbol so that, as a result of the mapping, transmission power assigned to each bit or each symbol is the same for all bits or all symbols, and so that transmission power is greater for a signal assigned to a subcarrier with good channel quality and transmission power is smaller for a signal assigned to a subcarrier with poor channel quality among signals composing each bit or each symbol.

3. The multicarrier transmitting apparatus according to claim 1, wherein the mapping section performs mapping while interleaving the duplicated signals in accordance with the predetermined mapping method.

4. The multicarrier transmitting apparatus according to claim 1, wherein the mapping section performs mapping so that the duplicated signals are not arranged in adjacent positions.

5. The multicarrier transmitting apparatus according to claim 1, wherein the mapping section arranges the duplicated signals so as to be mutually separated when mapped and arranges a signal of another channel between the separated and duplicated signals.

6. A multicarrier transmitting method comprising:

duplicating transmit data to generate a duplicated signal;

mapping the duplicated signal in accordance with a predetermined mapping method;

processing transmission power control of the duplicated and mapped signal to output a transmission-power-controlled signal; and transmitting the transmission-power-controlled signal using a multicarrier method, wherein in the transmission power control process, using a controller maximal-ratio combining type transmission power control is performed within each bit or each symbol for the post-mapping signal while keeping transmission power assigned to each bit or each symbol constant.

* * * * *